Dec. 11, 1956 S. F. BURNETT 2,773,578
ACTUATING MECHANISM FOR CLUTCHES
Filed July 27, 1953
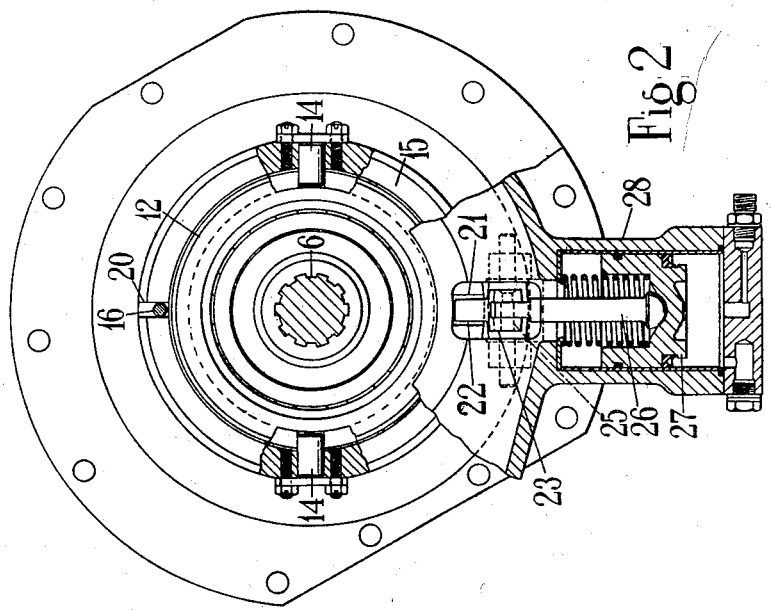
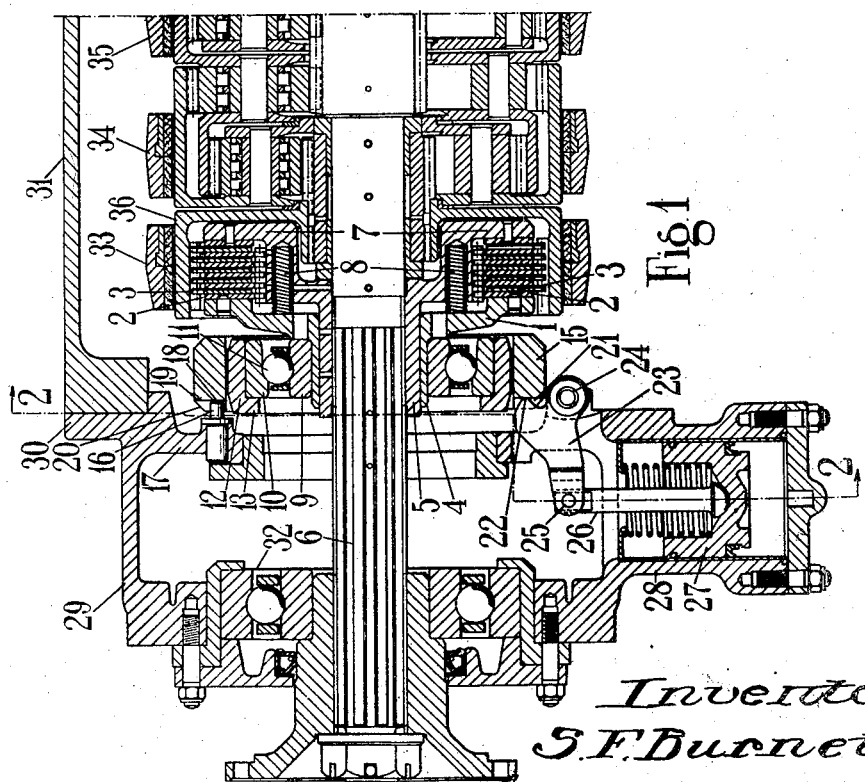
Inventor
S. F. Burnett

United States Patent Office 2,773,578
Patented Dec. 11, 1956

2,773,578
ACTUATING MECHANISM FOR CLUTCHES

Stanley Frederick Burnett, Coventry, England, assignor to Self-Changing Gears Limited, Coventry, England Application July 27, 1953, Serial No. 370,510

Claims priority, application Great Britain August 1, 1952

6 Claims. (Cl. 192—98)

This invention relates to actuating mechanism for clutches of the kind employing a fluid operated piston for applying the engaging pressure to the clutch surfaces, and has for its object to provide a simple and convenient mechanism which enables the applied pressure to be uniformly distributed whilst affording easy access to the operating piston and cylinder. This invention may be applied with particular advantage to clutches employed in conjunction with epicyclic gear boxes such for example as illustrated in British patent specifications Nos. 639,104, 641,831 and 642,054, but is not essentially restricted to such use.

The invention comprises a ring member mounted for tilting movement under the action of a fluid actuated piston and transmitting axial displacement for clutch actuation to an intermediate ring member connected to the tiltable member by substantially diametrically opposite pivots or trunnions, the axis of which lies in a plane other than the plane of tilting of the tiltable member, preferably at right-angles thereto.

In a preferred arrangement a fulcrum or reaction abutment for the tiltable ring member comprises a fixed or adjustable pin engaging an end face of the member, and the piston pressure is applied to a diametrically opposed point on the said face, preferably through a crank engaging the latter, the intermediate ring being mounted within the tiltable ring.

In the accompanying drawings:

Figure 1 is a longitudinal sectional elevation of a clutch actuating mechanism according to the invention as applied to an epicyclic change-speed gear box.

Figure 2 is a cross-sectional view of the mechanism taken on the line 2—2 of Figure 1.

In carrying the invention into effect according to one convenient mode as applied by way of example to an actuating mechanism for a multiple plate clutch, an axially displaceable pressure ring 1 for the interleaved clutch plates 2, 3 has a cylindrical flange 4 which is slidable upon a sleeve member 5 splined (or keyed) to a drive shaft 6. The sleeve member 5 has a flange 7 against which the clutch plates 2, 3 can be compressed by displacement of the pressure ring 1 against opposing coil springs 8 interposed between the pressure plate and said flange. A combined thrust and radial bearing of the ball type comprising inner and outer races 9, 10 and balls 11 is carried on the cylindrical flange 4 and thereby on the sleeve member 5, and supports an intermediate ring member 12 having an inwardly directed flange 13 on at least one side thereof for transmitting axial thrust to the pressure ring 1 through the said bearing. The intermediate ring member 12 is connected by radial pivot or trunnion pins 14 (Figure 2) to a tiltable ring member 15 surrounding the ring member 12 and radially spaced from it. A pin 16 mounted in a fixed casing or casing wall 17 extends parallel to the drive shaft and has a rounded or fulcrum end 18 abutting or engaging the base 19 of a recess 20 in the face of the tiltable ring member 15 on the side thereof remote from the clutch, the fulcrum point lying on a diameter at right angles to the diameter along which the trunnion or pivot pins 14 lie. A similar recess 21 diametrically opposed on the same face of the tiltable ring member 15 is engaged by a rounded projection or crank arm 22 on a lever 23 pivoted at 24 to the casing and extending generally parallel to the drive shaft. The free end of the lever 23 is connected at 25 to the thrust rod 26 of a spring-loaded piston 27 slidable in a cylinder 28 disposed at right-angles to the axis of the shaft 6, and the aforesaid rounded lever projection or crank arm 22 is shaped to impart a tilting movement to the tiltable ring member 15 when the piston 27 is moved inwardly, the said ring member 15 being tilted about its abutment with the fulcrum pin 16 and thereby affording a mechanical advantage in transmitting the piston force to the intermediate ring 12 and thence to the pressure ring 1. The length of the fulcrum pin 16 may be adjustable if desired. The piston 27 may be actuated by compressed air or by hydraulic or liquid pressure.

The multiple plate clutch conveniently forms part of an epicyclic gear box such as is illustrated in British patent specifications Nos. 639,104, 641,831, and 642,054. As shown in Figure 1, the clutch actuating mechanism is contained within a casing element 29 which forms the end cover of the gear box. The casing 29 has a flange 30 which is secured to the gear box casing 31. The casing or end cover element 29 also carries a bearing, indicated generally at 32, for the shaft 6. The gear box contains epicyclic gears controlled by band brakes as indicated at 33, 34 and 35, and the clutch plates 3 are engaged by a member 36 connected to one or more members of such epicyclic gears as shown.

By this invention, as illustrated in the example described above, there is provided a compact and convenient mechanism for actuating clutches, which may be of the multiple plate type or otherwise, by which the force applied to the clutch thrust bearing and to the clutch surface or surfaces is uniformly distributed without the necessity of employing an annular piston or an annular series of pistons, and a single actuating piston may be disposed in a conveniently accessible position for removal or replacement when required.

It will be understood that the common axis of the pivots or trunnions need not necessarily lie at right-angles to the plane of tilting of the tiltable member.

I claim:

1. Actuating mechanism for clutches comprising, in combination, an axially displaceable pressure ring for applying engagement pressure to the clutch surfaces, an intermediate ring member mounted upon said pressure ring with an interposed thrust bearing, a tiltable ring member connected to and supported by the intermediate ring member by diametrically opposed and radially inwardly directed pivotal connections, said tiltable ring member having a substantially uninterrupted outer periphery, abutment means engaging an end surface of the tiltable ring member within the outer periphery thereof at a point lying in a plane other than the plane of tilting of the tiltable ring member, a pivotally mounted bell crank member including an arm movable into and out of abutting relation with the said end face of the tiltable ring member within the outer periphery thereof and at a point diametrically opposite the engagement point of the aforesaid abutment means whereby clutch engagement pressure can be applied to said tiltable ring member by movement of said arm, and a fluid pressure operable piston operatively connected to said bell crank lever for applying such clutch engagement pressure.

2. Mechanism according to claim 1, comprising a fixed casing and in which the abutment means comprises a pin mounted in the casing and extending parallel to the clutch axis arranged so that an end of the pin freely engages the end surface of the tiltable ring member.

3. Mechanism according to claim 1 comprising a fixed casing for the mechanism, a cylinder for the fluid operable piston carried by said casing and having its axis disposed transversely with respect to the clutch axis, a direct connection between said piston and said bell crank lever, and a removable cover at the outer end of the cylinder permitting access to the piston.

4. Mechanism according to claim 1, in which the tiltable ring member has recessed end faces for receiving respectively the abutment means and a projection on an arm of the bell crank lever.

5. Mechanism according to claim 1, in which a sleeve mounted on the clutch driving shaft carries the slidable clutch pressure plate, and in which the thrust bearing has the form of a combined thrust and journal bearing.

6. Mechanism according to claim 1, in which the fluid operable piston is arranged in a cylinder carried by an enclosing casing element, and said casing element constitutes an end cover for an epicyclic gear box to which the clutch mechanism is applied.

References Cited in the file of this patent

UNITED STATES PATENTS

| | | |
|---|---|---|
| 285,883 | Fisher | Oct. 2, 1883 |
| 2,100,810 | Livermore | Nov. 30, 1937 |
| 2,157,429 | Padden | May 9, 1939 |
| 2,624,437 | Gardner | Jan. 6, 1953 |